(12) United States Patent
Nicolini (10) Patent No.: US 7,415,271 B2
(45) Date of Patent: Aug. 19, 2008

(54) METHOD AND SYSTEM FOR PERFORMING FAILED WIRELESS COMMUNICATION DIAGNOSTICS

(75) Inventor: Daniele Nicolini, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 171 days.

(21) Appl. No.: 10/961,348

(22) Filed: Oct. 8, 2004

(65) Prior Publication Data

US 2006/0079219 A1    Apr. 13, 2006

(51) Int. Cl.
*H04Q 7/20* (2006.01)
(52) U.S. Cl. ............. 455/423; 379/221.03; 379/221.04; 455/418; 455/419; 455/425; 455/435.1
(58) Field of Classification Search ................. 455/417, 455/418, 419, 551
See application file for complete search history.

(56) References Cited

U.S. PATENT DOCUMENTS

| | | | | |
|---|---|---|---|---|
| 5,297,192 A | * | 3/1994 | Gerszberg | 455/419 |
| 5,301,223 A | * | 4/1994 | Amadon et al. | 455/409 |
| 5,603,084 A | * | 2/1997 | Henry et al. | 455/419 |
| 5,774,804 A | * | 6/1998 | Williams | 455/419 |
| 5,875,394 A | * | 2/1999 | Daly et al. | 455/411 |
| 6,393,298 B1 | * | 5/2002 | Fulton | 455/551 |
| 6,493,552 B1 | * | 12/2002 | Hicks | 455/435.2 |
| 6,697,637 B1 | * | 2/2004 | Willey | 455/551 |
| 6,819,916 B1 | * | 11/2004 | Griffith et al. | 455/410 |
| 2003/0087642 A1 | * | 5/2003 | Mazzara | 455/450 |
| 2003/0211854 A1 | * | 11/2003 | Mazzara, Jr. | 455/458 |

* cited by examiner

*Primary Examiner*—Vincent P. Harper
*Assistant Examiner*—Mazda Sabouri

(57) ABSTRACT

A method and computer usable medium storing a computer program for performing failed wireless communication diagnostics are disclosed. A failed transmission condition is recognized. A cleared number communication channel is established between a telematics unit and either a service provider or a call center responsive to the received failed transmission condition. A communication device identifier is sent to the service provider. A communication parameter associated with data generated by the service provider is received at the telematics unit.

4 Claims, 5 Drawing Sheets

METHOD AND SYSTEM FOR PERFORMING FAILED WIRELESS COMMUNICATION DIAGNOSTICS

FIELD OF THE INVENTION

This invention relates generally to wireless communication systems. In particular the invention relates to a method and system for performing wireless communication diagnostics responsive to a failed transmission condition.

BACKGROUND OF THE INVENTION

The opportunity to personalize features in a mobile vehicle is ever increasing as the automobile is being transformed into a communications platform as well as a transportation platform. Projections are that in the future many new cars will include some type of telematics unit to provide wireless communication and location-based services. These services may be accessed through interfaces such as voice-recognition computer applications, touch-screen computer displays, computer keyboards, or buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

For example, traffic and driving directions are accessible through a voice portal that uses incoming number identification to generate location information based on the area code or prefix of the phone number, or to access location information stored in a user's profile associated with the phone number. In some embodiments, users are prompted to enter more details through a voice interface. Other examples are web and wireless portals that offer location-based services such as maps and driving directions: the user enters both a start and end addresses. Some of these services have a voice interface.

When a cellular communication device, such as for example, an embedded or in-vehicle phone or a telematics unit, initiates a call, a cellular communication channel is typically established between the cellular communication device and the wireless carrier system. Prior to permitting the initiated call to be placed through the wireless carrier system, the wireless carrier system performs a check on behalf of the service provider to ensure that the cellular device is registered for service with the service provider. If the wireless carrier system discovers a problem with the cellular device registration, registration of the cellular device is denied and the call is not allowed.

If the telematics unit was denied a call while attempting to perform a telematics unit function that is transparent to the mobile vehicle user, the mobile vehicle user may not know that many telematics services may be unavailable due to wireless communication failure. If the mobile vehicle user discovers the failed wireless communication problems when attempted to place a call using the embedded or in-vehicle phone, the user may not know how to begin to resolve the wireless communication failure. The mobile vehicle user may take the vehicle into a dealership so that a trained technician can troubleshoot the failed communication problems. This can be time consuming and expensive for the mobile vehicle user if the mobile vehicle is no longer under warranty. This may lead to customer dissatisfaction with the telematics services, the mobile vehicle and/or the mobile vehicle manufacturer. If the mobile vehicle is still under warranty, the repair costs are borne by the vehicle dealership or vehicle manufacturer.

It is desirable, therefore, to provide methods and computer usable mediums to perform wireless communication diagnostics responsive to a failed transmission signal, thus overcoming the limitations described above.

SUMMARY OF THE INVENTION

One aspect of the present invention provides a method of performing failed wireless communication diagnostics. The method includes recognizing a failed transmission condition, establishing a cleared number communication channel between a telematics unit and a service provider responsive to the failed transmission condition, sending a communication device identifier to the service provider from the telematics unit, and receiving a communication parameter from the service provider at the telematics unit.

A second aspect of the invention provides a computer readable medium storing a computer program for performing failed wireless communication diagnostics. The medium comprises computer readable code for recognizing a failed transmission condition, computer readable code for establishing a cleared number communication channel between a telematics unit and a service provider responsive to the failed transmission condition, computer readable code for sending a communication device identifier to the service provider from the telematics unit, and computer readable code for receiving a communication parameter from the service provider at the telematics unit.

A third aspect of the invention provides a method of performing failed wireless communication diagnostics. The method includes recognizing a failed transmission condition, establishing a cleared number communication channel between a telematics unit and a call center responsive to the failed transmission condition, sending a communication device identifier to a service provider from the call center, and receiving a communication parameter from the call center at the telematics unit.

A fourth aspect of the invention provides a computer readable medium storing a computer program for performing failed wireless communication diagnostics. The medium comprises computer readable code for recognizing a failed transmission condition, computer readable code for establishing a cleared number communication channel between a telematics unit and a call center responsive to the failed transmission condition, computer readable code for sending a communication device identifier to a service provider from the call center, and computer readable code for receiving a communication parameter from the call center at the telematics unit.

The foregoing device and other devices as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention is illustrated by way of example and not limited in scope to the accompanying figures, in which like references indicate similar elements, and in which.

DETAILED DESCRIPTION OF THE PRESENTLY PREFERRED EMBODIMENTS

Figure 1:
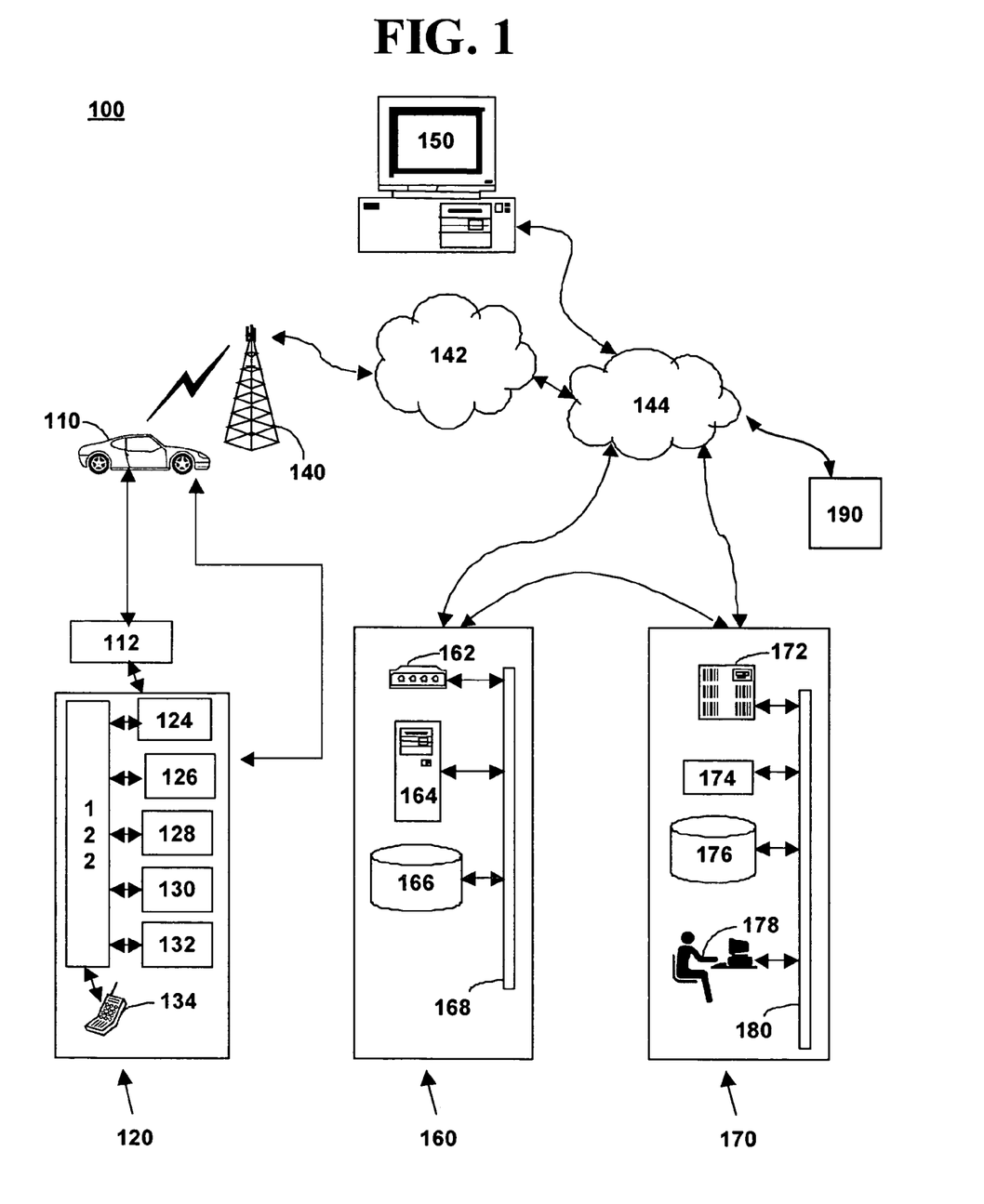
FIG. 1 is a schematic diagram of one embodiment of a system for performing failed wireless communication diagnostics for a mobile vehicle in accordance with the present invention.

FIG. 1 illustrates one embodiment of a system for data transmission over wireless communication system, in accordance with the present invention at 100. The mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, the MVCU 110 is implemented as a mobile vehicle equipped with suitable hardware and software for transmitting and receiving voice and data communications. A display may be embedded in the MVCU 110. The display may be a dialed digital display, such as, a radio unit or an instrument panel. The MVCS 100 may include additional components not relevant to the present discussion. Mobile vehicle communication systems and telematics units are known in the art.

The MVCU 110 may also be referred to as a mobile vehicle throughout the discussion below. In operation, the MVCU 110 may be implemented as a motor vehicle, a marine vehicle, or as an aircraft. In one embodiment, the MVCU 110 includes additional components not relevant to the present discussion.

The MVCU 110, via a vehicle communication network 112, sends signals to various units of equipment and systems (detailed below) within the MVCU 110 to perform various functions such as unlocking a door, opening the trunk, setting personal comfort settings, and calling from the telematics unit 120. In facilitating interactions among the various communication and electronic modules, the vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

The MVCU 110, via the telematics unit 120, sends and receives radio transmissions from the wireless carrier system 140. The wireless carrier system 140 is implemented as any suitable system for transmitting a signal from the MVCU 110 to the communication network 142.

The telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, the telematics unit 120 may be implemented without one or more of the above listed components, such as, for example the GPS unit 126 or the speakers 132. The telematics unit 120 may include additional components not relevant to the present discussion.

In one embodiment, the processor 122 is implemented as a microcontroller, microprocessor, controller, host processor, or vehicle communications processor. In an example, the processor 122 is implemented as an application specific integrated circuit (ASIC). In another embodiment, the processor 122 is implemented as a processor working in conjunction with a central processing unit (CPU) performing the function of a general purpose processor. The GPS unit 126 provides longitude and latitude coordinates of the vehicle responsive to a GPS broadcast signal received from a one or more GPS satellite broadcast systems (not shown). The in-vehicle mobile phone 134 is a cellular-type phone, such as, for example an analog, digital, dual-mode, dual-band, multi-mode or multi-band cellular phone.

The processor 122 executes various computer programs that control programming and operational modes of electronic and mechanical systems within the MVCU 110. The processor 122 controls communications (e.g. call signals) between the telematics unit 120, the wireless carrier system 140, and the call center 170. In one embodiment, a voice-recognition application is installed in the processor 122 that can translate human voice input through the microphone 130 to digital signals. The processor 122 generates and accepts digital signals transmitted between the telematics unit 120 and a vehicle communication network 112 that is connected to various electronic modules in the vehicle. In one embodiment, these digital signals activate the programming mode and operation modes, as well as provide for data transfers. In this embodiment, signals from the processor 122 are translated into voice messages and sent out through the speaker 132.

The communication network 142 includes services from one or more mobile telephone switching offices and wireless networks. The communication network 142 connects the wireless carrier system 140 to the land network 144. The communication network 142 is implemented as any suitable system or collection of systems for connecting the wireless carrier system 140 to the MVCU 110 and the land network 144.

The land network 144 connects the communication network 142 to the client computer 150, the web-hosting portal 160, and the call center 170. In one embodiment, the land network 144 is a public-switched telephone network (PSTN). In another embodiment, the land network 144 is implemented as an Internet protocol (IP) network. In other embodiments, the land network 144 is implemented as a wired network, an optical network, a fiber network, other wireless networks, or any combination thereof. The land network 144 is connected to one or more landline telephones. The communication network 142 and the land network 144 connect the wireless carrier system 140 to the web-hosting portal 160 and the call center 170.

The client, personal or user computer 150 includes a computer usable medium to execute Internet browser and Internet-access computer programs for sending and receiving data over the land network 144 and the optionally, wired or wireless communication networks 142 to the web-hosting portal 160. The personal or client computer 150 sends user preferences to the web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within the MVCU 110. In operation, a client utilizes the computer 150 to initiate setting or re-setting of user-preferences for the MVCU 110. User-preference data from client-side software is transmitted to server-side software of the web-hosting portal 160. User-preference data is stored at the web-hosting portal 160.

The web-hosting portal 160 includes one or more data modems 162, one or more web servers 164, one or more databases 166, and a network system 168. The web-hosting portal 160 is connected directly by wire to the call center 170, or connected by phone lines to the land network 144, which is connected to the call center 170. In an example, the web-hosting portal 160 is connected to the call center 170 utilizing an IP network. In this example, both components, the web-hosting portal 160 and the call center 170, are connected to the land network 144 utilizing the IP network. In another example, the web-hosting portal 160 is connected to the land network 144 by one or more data modems 162. The land network 144 sends digital data to and from the modem 162, data that is then transferred to the web server 164. The modem 162 may reside inside the web server 164. The land network 144 transmits data communications between the web-hosting portal 160 and the call center 170.

The web server 164 receives user-preference data from the user computer 150 via the land network 144. In alternative embodiments, the computer 150 includes a wireless modem to send data to the web-hosting portal 160 through a wireless communication network 142 and a land network 144. Data is received by the land network 144 and sent to one or more web servers 164. In one embodiment, the web server 164 is implemented as any suitable hardware and software capable of providing web services to help change and transmit personal preference settings from a client at the computer 150 to the telematics unit 120 in MVCU 110. The web server 164 sends to or receives from one or more databases 166 data transmissions via the network system 168. The web server 164 includes computer applications and files for managing and storing personalization settings supplied by the client, such as door lock/unlock behavior, radio station preset selections, climate controls, custom button configurations and theft alarm settings. For each client, the web server 164 potentially stores hundreds of preferences for wireless vehicle communication, networking, maintenance and diagnostic services for a mobile vehicle.

In one embodiment, one or more web servers 164 are networked via the network system 168 to distribute user-preference data among its network components such as the database 166. In an example, the database 166 is a part of or a separate computer from the web server 164. The web server 164 sends data transmissions with user preferences to the call center 170 through the land network 144.

The call center 170 is a location where many calls are received and serviced at the same time, or where many calls are sent at the same time. In one embodiment, the call center 170 is a telematics call center, facilitating communications to and from the telematics unit 120 in the MVCU 110. In an example, the call center 170 is a voice call center, providing verbal communications between an advisor in the call center and a subscriber in a mobile vehicle. In another example, the call center 170 contains each of these functions. In other embodiments, the call center 170 and the web-hosting portal 160 are located in the same or different facilities.

The call center 170 contains one or more voice and data switches 172, one or more communication services managers 174, one or more communication services databases 176, one or more communication services advisors 178, and one or more network systems 180.

The switch 172 of the call center 170 connects to the land network 144. The switch 172 transmits voice or data transmissions from the call center 170, and receives voice or data transmissions from the telematics unit 120 in the MVCU 110 through the wireless carrier system 140, the communication network 142, and the land network 144. The switch 172 receives data transmissions from and sends data transmissions to one or more web-hosting portals 160. The switch 172 receives data transmissions from or sends data transmissions to one or more communication services managers 174 via one or more network systems 180.

The communication services manager 174 is any suitable hardware and software capable of providing requested communication services to the telematics unit 120 in the MVCU 110. The communication services manager 174 sends to or receives from one or more communication services databases 176 data transmissions via the network system 180. The communication services manager 174 sends to or receives from one or more communication services advisors 178 data transmissions via the network system 180. The communication services database 176 sends to or receives from the communication services advisor 178 data transmissions via the network 180. The communication services advisor 178 receives from or sends to the switch 172 voice or data transmissions.

The communication services manager 174 provides one or more of a variety of services, including enrollment services, navigation assistance, directory assistance, roadside assistance, business or residential assistance, information services assistance, emergency assistance, and communications assistance. The communication services manager 174 receives service-preference requests for a variety of services from the client via the computer 1560, the web-hosting portal 160 and the land network 144. The communication services manager 174 transmits user-preference and other data to the telematics unit 120 in the MVCU 110 through the wireless carrier system 140, the communication network 142, the land network 144, the voice and data switch 172, and the network system 180. The communication services manager 174 stores or retrieves data and information from communication services database 176. The communication services manager 174 may provide requested information to the communication services advisor 178.

In one embodiment, the communication services advisor 178 is implemented as a real advisor. In an example, a real advisor is a human being in verbal communication with a user or subscriber (e.g. a client) in the MVCU 110 via the telematics unit 120. In another embodiment, the communication services advisor 178 is implemented as a virtual advisor. In an example, a virtual advisor is implemented as a synthesized voice interface responding to requests from the telematics unit 120 in MVCU 110.

The communication services advisor 178 provides services to the telematics unit 120 in the MVCU 110. Services provided by the communication services advisor 178 include enrollment services, navigation assistance, real-time traffic advisories, directory assistance, roadside assistance, business or residential assistance, information services assistance, emergency assistance, and communications assistance. The communication services advisor 178 communicates with the telematics unit 120 in MVCU 110 through the wireless carrier system 140, the communication network 142, the land network 144, and the web hosting portals 160 using voice transmissions. In an alternative embodiment, the communication services manager 174 communicates with the telematics unit 120 in the MVCU 110 through the wireless carrier system 140, the communication network 142, the land network 144 and the web hosting portals 160 using voice transmissions. The switch 172 selects between voice transmissions and data transmissions.

The MVCU 110, via the telematics unit 120, sends and receives radio transmissions from the wireless carrier system 140. The MVCU user signs up with a service provider 190. The service provider 190 supports the telematics unit communications. When the telematics unit 120 attempts to conduct a periodic registration with the wireless carrier system 140, or attempts to place an authenticated call to the call center 170, or the MVCU user attempts to place an authenticated call using the embedded or in-vehicle phone 134, the telematics unit 120 begins the process of placing an authenticated call by attempting to register with the service provider 190 via the wireless carrier system 140. The wireless carrier system 140 performs a registration check to ensure that the telematics unit 120 is registered with a service provider 190 before connecting the authenticated call. If the wireless system 140 determines that the telematics unit 120 is not registered with a service provider 190, the wireless carrier system 140 denies the placement of the authenticated call.

Figure 2:
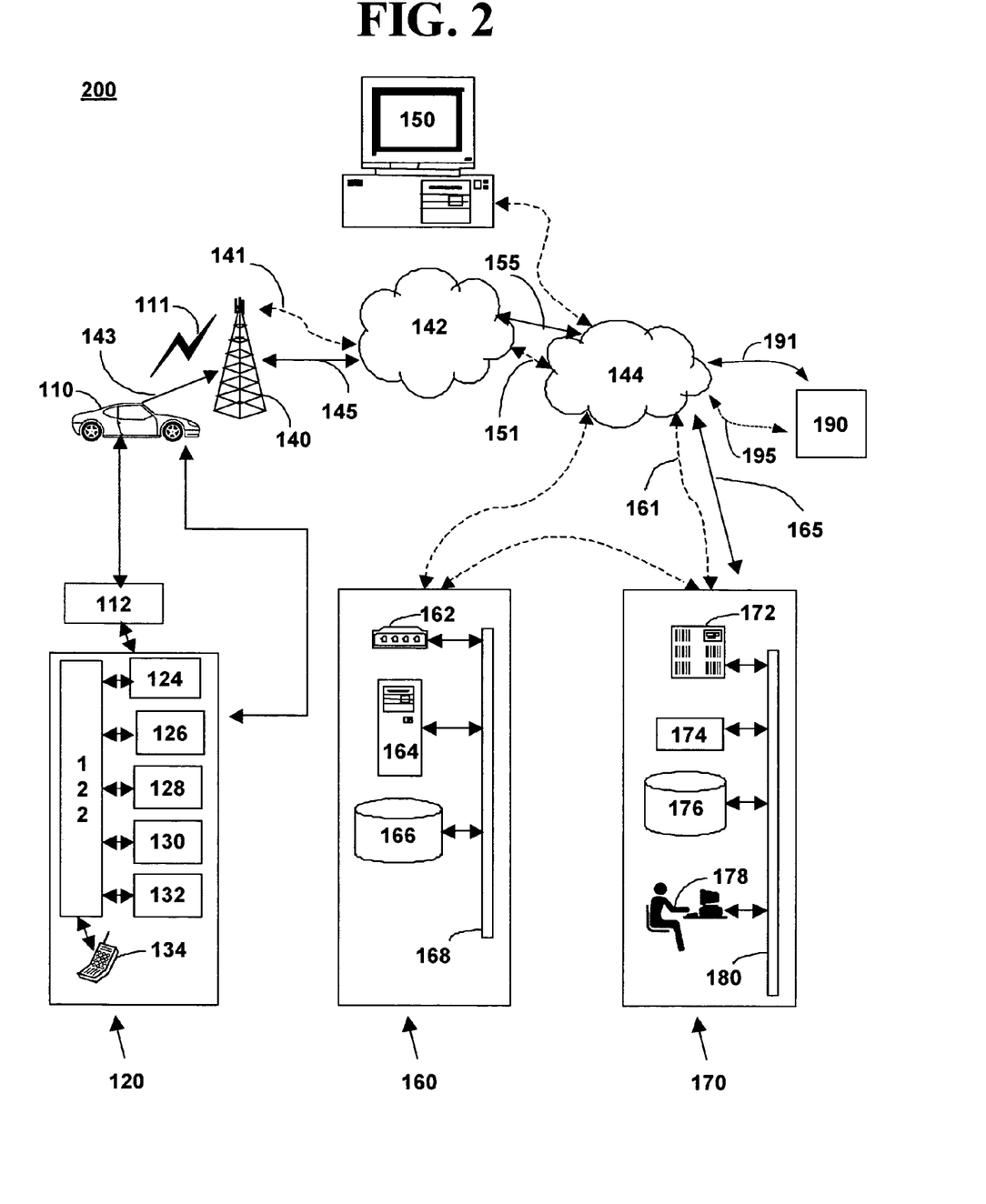
FIG. 2 is a schematic diagram of another embodiment of a system for performing failed wireless communication diagnostics for a mobile vehicle in accordance with the present invention.

FIG. 2 is a schematic diagram of another embodiment of a system for performing failed wireless communication diagnostics for a mobile vehicle in accordance with the present invention. When the telematics unit 120 places an authenticated call to a party, an authenticated communication channel is established between the telematics unit 120 and the party. When the MVCU user places an authenticated call using the embedded or in-vehicle phone 134 to a party, the authenticated call is placed via the telematics unit 120. Depending on the communication device used by the party, the authenticated communication channel consists of a one or more authenticated communication sub-channels 111, 141, 151, 161, 191. When the telematics unit 120 places an authenticated call, the authenticated communication channel consists of an authenticated communication sub-channel 111 between the telematics unit 120 and the wireless carrier system 140 and one or more other authenticated communication sub-channels. The other authenticated communication sub-channels include one or more of the following: an authenticated communication sub-channel 141 between the wireless carrier system 140 and the communication network 142; an authenticated communication sub-channel 151 between the communication network 142 and the land network 144; an authenticated communication sub-channel 161 between the land network 144 and the call center 170; and an authenticated communication sub-channel 191 between the land network 144 and the service provider 190.

When any cellular communication device, such as the telematics unit 120, attempts to place an authenticated call, the wireless carrier system 140 performs a registration check to ensure that the telematics unit 120 is registered with a service provider 190 before connecting the call. If the wireless system 140 determines that the telematics unit 120 is not registered with a service provider 190, the wireless carrier system 140 denies registration of the telematics unit 120 thereby denying completion of the call.

When the telematics unit 120 recognizes that the wireless carrier system 140 has denied the telematics unit 120 registration thereby denying placement of the call from the telematics unit 120, the telematics unit 120 recognizes that a failed transmission condition has occurred. In one embodiment, responsive to the failed transmission condition, the telematics unit 120 attempts to establish a cleared number communication channel with the service provider 190.

When the telematics unit 120 places a cleared number call to a party, a cleared number communication channel is established between the telematics unit 120 and the party. Depending on the communication device used by the party, the cleared number communication channel consists of a one or more cleared number communication sub-channels. When the telematics unit 120 places a cleared number call, the cleared number communication channel consists of a cleared number communication sub-channel 143 between the telematics unit 120 and the wireless carrier system 140 and one or more other cleared number communication sub-channels. The other cleared number communication sub-channels include one or more of the following sub-channels: a cleared number communication sub-channel 145 between the wireless carrier system 140 and the communication network 142; a cleared number communication sub-channel 155 between the communication network 142 and the land network 144; a cleared number communication sub-channel 165 between the land network 144 and the call center 170; and a cleared number communication sub-channel 195 between the land network 144 and the service provider 190.

Figure 3:
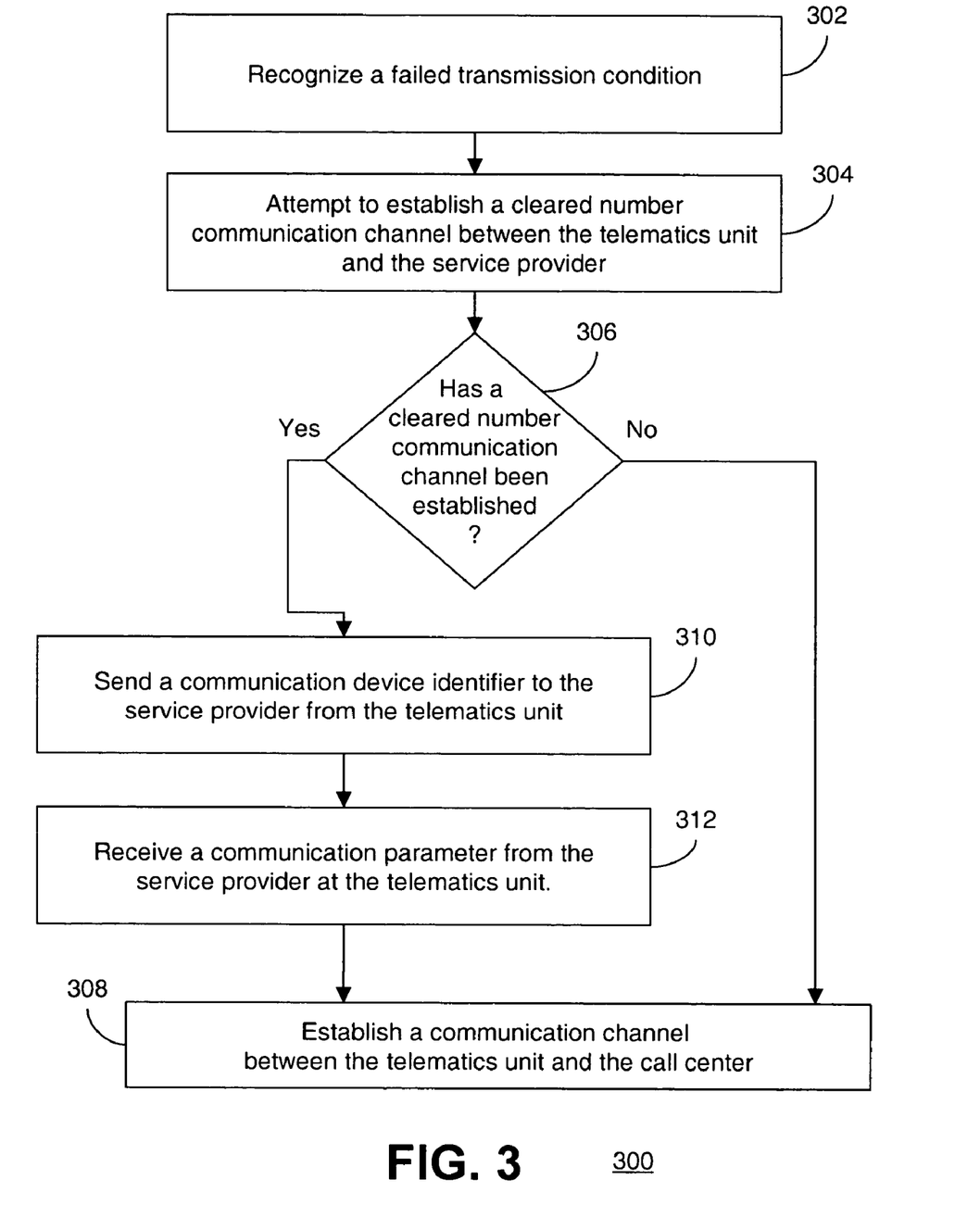
FIG. 3 is a flow diagram of one embodiment of a method for performing wireless communication diagnostics for a mobile vehicle in accordance with the present invention.

FIG. 3 is a flow diagram of one embodiment of a method 300 for performing wireless communication diagnostics for a MVCU 110 in accordance with the present invention. When the telematics unit 120 recognizes a failed transmission condition (Block 302), the telematics unit 120 attempts to establish a cleared number communication channel with the service provider 190 (Block 304). The telematics unit 120 determines if a cleared communication channel has been established with the service provider 190 (Block 306). If the telematics unit 120 fails to establish a cleared number communication channel, the telematics unit 120 establishes a communication channel with the call center 170 (Block 308). If the telematics unit 120 successfully establishes a cleared number communication channel with the service provider 190, the telematics unit 120 sends a communication device identifier to the service provider 190 (Block 310). The service provider 190 sends a communication parameter to the telematics unit 120 based on the received communication device identifier (Block 312). The telematics unit 120 contacts the call center 170 to update the MVCU user records in the communication services database 176 with the received communication parameter (Block 308).

The MVCU 110, via the telematics unit 120, sends and receives radio transmissions from the wireless carrier system 140. When the telematics unit 120 attempts to conduct a periodic registration with the wireless carrier system 140, or attempts to place a call to the call center 170, or the MVCU user attempts to place a call using the embedded or in-vehicle phone 134, the telematics unit 120 begins the process of placing a call by attempting to register with the service provider 190 via the wireless carrier system 140. The wireless carrier system 140 performs a registration check to ensure that the telematics unit 120 is registered with a service provider 190 before connecting the call. If the wireless system 140 determines that the telematics unit 120 is not registered with a service provider 190, the wireless carrier system 140 denies the telematics unit 120 registration thereby denying placement of the call.

Each cellular device, such as the telematics unit 120, has an embedded electronic serial number (ESN) that is assigned to the cellular device by the manufacturer. The service provider 190 assigns a mobile identification number (MIN) to the cellular device. The service provider 190 maintains a listing of all of the ESNs of the cellular devices registered with that service provider 190. The service provider 190 maintains a listing of all of the assigned MINs and the specific ESNs associated with each of the assigned MINs.

During the registration process, the wireless carrier system 140 compares the telematics unit ESN with the telematics unit MIN. The wireless carrier system 140 transmits a handshake back to the wireless modem 124 when the wireless carrier system 140 confirms registration of the telematics unit 120 and an authenticated communication channel is established between the wireless carrier system 140 and the telematics unit 120. Conversely, if the wireless carrier system 140 determines that the telematics unit 120 attempting to register has an ESN that does not match the MIN assigned to that telematics unit 120, the wireless carrier system 140 denies registration. The telematics units 120 recognizes that a failed transmission condition has occurred when the wireless modem 124 receives a registration denial (Block 302).

When the telematics unit 120 recognizes a failure to establish an authenticated communication channel 141 between the telematics unit 120 and the wireless carrier system 140, the telematics unit 120 attempts to establish a cleared number communication channel via cleared number communication sub-channels 143, 145, 155, 195 with the service provider 190 using a cleared number (Block 304). In one embodiment, the cleared number is a cleared non-validating number. In another embodiment, the cleared number is a cleared number voice call number.

The telematics unit 120 determines if a cleared number communication channel has been established between the telematics unit 120 and the service provider 190 (Block 306). In one embodiment, the telematics unit 120 fails to establish a cleared number communication channel between the telematics unit 120 and the service provider 190 if the MVCU 110 is out of range of the service provider 190 area, such as for example, in an area where a service provider 190 relies on a partner service provider 190 to provide communication coverage. In another embodiment, the telematics unit 120 fails to establish a cleared number communication channel with the service provider 190 if the MVCU user account with the service provider 190 has expired. In another embodiment, the telematics unit 120 fails to establish a cleared number communication channel with the service provider 190 if the telematics unit 120 does not have the appropriate symbolic instruction debugger/preferred roaming list (SID/PRL) or an updated version of the SID/PRL list.

If a cleared number communication channel is not successfully established between the telematics unit 120 and the service provider 190, the telematics unit 120 attempts to establish an authenticated communication channel with the call center 170 (Block 308). The telematics unit 120 works with the call center 170 to investigate the failed transmission condition. Method 400 shown in FIGS. 4-5 defines the interactions between the telematics unit 120 and the call center 170. Method 400 is described in greater detail below.

If a cleared number communication channel is established between the telematics unit 120 and the service provider 190, the telematics unit 120 sends a communication device identifier to the service provider 190 (Block 310). In one embodiment, the communication device identifier is the telematics unit ESN. The service provider 190 investigates the telematics unit 120 failed transmission condition and sends a communication parameter to the telematics unit 120 based on the results of the investigation (Block 312). The communication parameter consists of either an enabling communication parameter or a non-enabling communication parameter. If the service provider 190 resolves the failed transmission condition, the telematics unit 120 receives an enabling communication parameter from the service provider 190. If the service provider 190 is unable to resolve the failed transmission condition, the telematics unit 190 receives a non-enabling communication parameter.

In one embodiment, the communication parameter is the MIN assigned to the telematics unit 120 by the service provider 190. In one embodiment, the service provider 190 determines if the MIN listed as assigned to the telematics unit 120 is the MIN that is actually programmed in the telematics unit 120.

The cleared number communication channel is established between the telematics unit 120 and the service provider 190 using the MIN that has been programmed into the telematics unit 120. When the telematics unit 120 places a call, the telematics unit 120 is identified by the party receiving the call by the programmed MIN. Thus the programmed telematics unit MIN is apparent to the service provider 190 when the cleared number communication channel is established between the telematics unit 120 and the service provider 190.

The service provider 190 uses the received telematics ESN to identify the MIN listed as assigned to the telematics unit 120 in the service provider 190 records. The service provider 190 compares the MIN listed as assigned to the telematics unit 120 with the MIN actually programmed into the telematics unit 120. If the MIN listed as assigned to the telematics unit 120 is different from the MIN actually programmed into the telematics unit 120, the service provider 190 updates the MIN programmed in the telematics unit 120 to reflect the MIN actually assigned to the telematics unit 120. The updated MIN is the enabling communication parameter.

In one embodiment, if the service provider 190 is unable to resolve the failed transmission condition or determines that the mobile vehicle user is not qualified to receive service provider services, a non-enabling communication parameter is received by the telematics unit 120.

The telematics unit 120 establishes a communication channel between the telematics unit and the call center 170 (Block 308. The telematics unit 120 sends the communication parameter received from the service provider 190 to the call center 170. The call center 170 updates the communication services database 176 with the received communication parameter. Method 400 shown in FIG. 4 defines the interactions between the telematics unit 120 and the call center 170. Method 400 is described in greater detail below.

Figure 4:
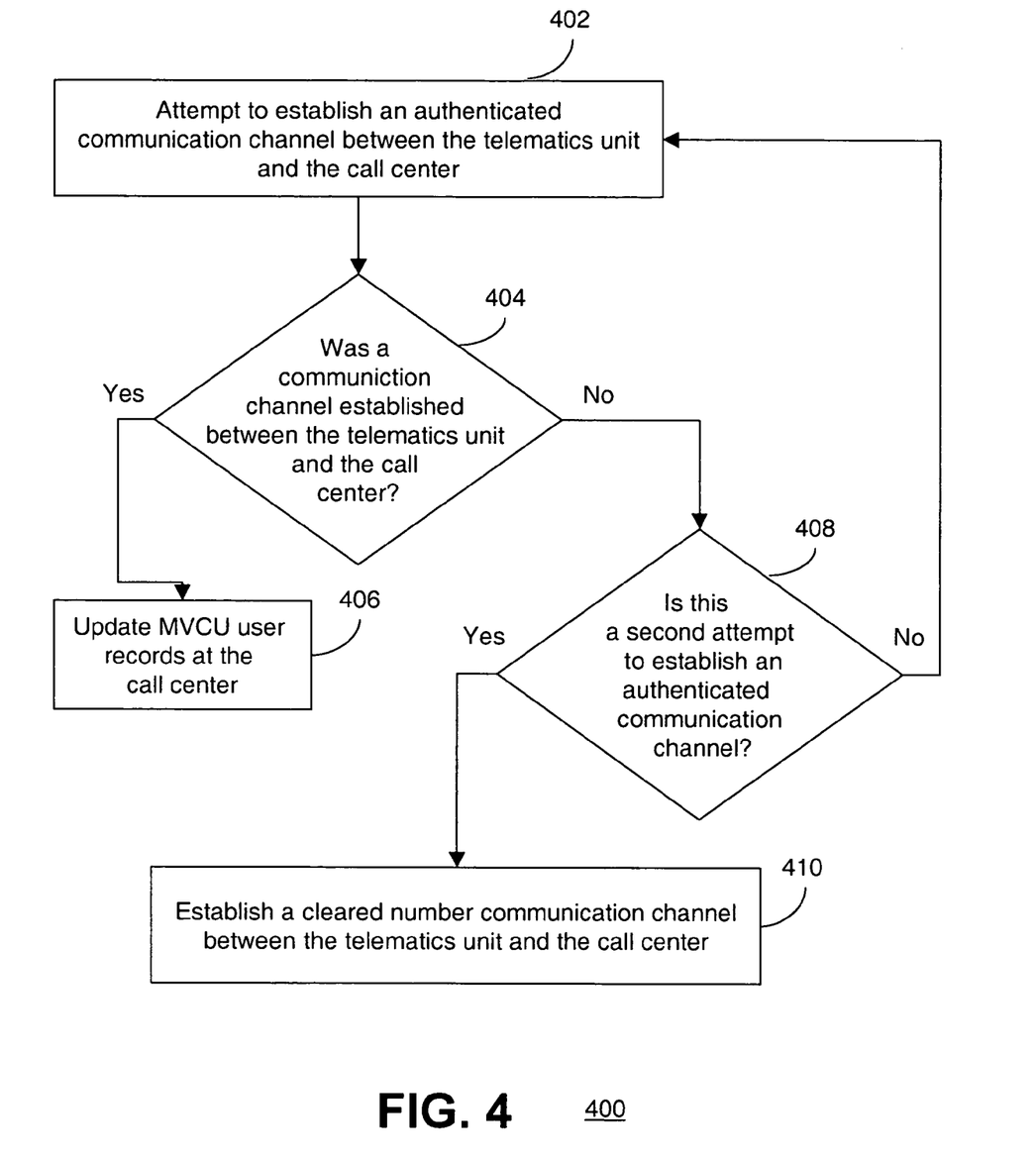
FIG. 4 is a flow diagram of one embodiment of a method of establishing a communication channel between a telematics unit and a call center in accordance with the present invention.

FIG. 4 is a flow diagram of one embodiment of a method 400 of establishing a communication channel between the telematics unit 120 and the call center 170 in accordance with the present invention. In one embodiment, the telematics unit 120 works with the service provider 190 to attempt to resolve the failed transmission condition as is described above. In one embodiment, if the service provider 190 is inaccessible via a cleared communication channel, the telematics unit 120 contacts the call center 170 to resolve the failed transmission condition. In one embodiment, if the service provider 190 is accessible via the cleared communication channel and the failed transmission condition is resolved, the telematics unit 120 contacts the call center 170 to update the MVCU user records in the communication services database 176. For example, if the telematics unit 120 is updated with a new MIN by the service provider 190, the telematics unit 120 contacts the call center 170 to update the communication services database 176 to reflect the new MIN. If the telematics unit 120 contacts the service provider 190 and the failed transmission condition remains unresolved, the call center 170 works with the service provider 190 to resolve the failed transmission condition.

In another embodiment, the telematics unit 120 does not contact the service provider 190. When the telematics unit 120 detects a failed transmission condition, the telematics unit 120 establishes a communication channel with the call center 170 and the call center 170 works with the service provider 190 to resolve the failed transmission condition.

The method 400 begins with the telematics unit 120 attempting to establish an authenticated communication channel via authenticated communication sub-channels 111, 141, 151, 161 between the telematics unit 120 and the call center 170 (Block 402). The telematics unit 120 determines whether an authenticated communication channel has been established between the telematics unit 120 and the call center 170 (Block 404).

In one embodiment, as described with reference to FIG. 3 above, the telematics unit 120 contacts the service provider 190 prior to contacting the call center 170 and attempts to resolve the failed transmission condition with the service provider 190. If the failed transmission condition was resolved and the telematics unit 120 received an enabling communication parameter, an authenticated communication channel is established between the telematics unit 120 and the call center 170. For example, if the failed transmission condition was resolved by programming the telematics unit 120 with an updated MIN, the wireless carrier system 140 permits the authenticated call to the call center 170 to be placed. Once the authenticated communication channel is established between the telematics unit 120 and the call center 170, the MCVU user records in the communication services database 176 are updated to reflect the new MIN associated with the telematics unit 120 (Block 406).

In one embodiment, the telematics unit 120 makes two attempts to establish an authenticated communication channel with the call center 170. If the telematics unit 120 fails to establish an authenticated communication channel with the call center 170, the telematics unit 120 checks to see if the failure to establish an authenticated communication channel occurred during a second attempt to establish an authenticated communication channel with the call center 170 (Block 408). If the failure to establish an authenticated communication channel was during the first attempt to place an authenticated call, the telematics unit 120 makes another attempt to establish an authenticated communication channel with the call center 170 (Block 402). If the failure to establish an authenticated communication channel was during the second attempt to place an authenticated call to the call center 170, the telematics unit 120 establishes a cleared number communication channel with the call center 170 (Block 410). In one embodiment, the cleared number call is made using a cleared non-validating number. In another embodiment, the cleared number call is made using a cleared voice call number.

While an embodiment has been described where the telematics unit 120 makes two attempts to place a call, other embodiments of the invention where the telematics unit 120 makes a single attempt or greater than two attempts to place an authenticated call to the call center 170 are also considered to be within the scope of the invention.

Figure 5:
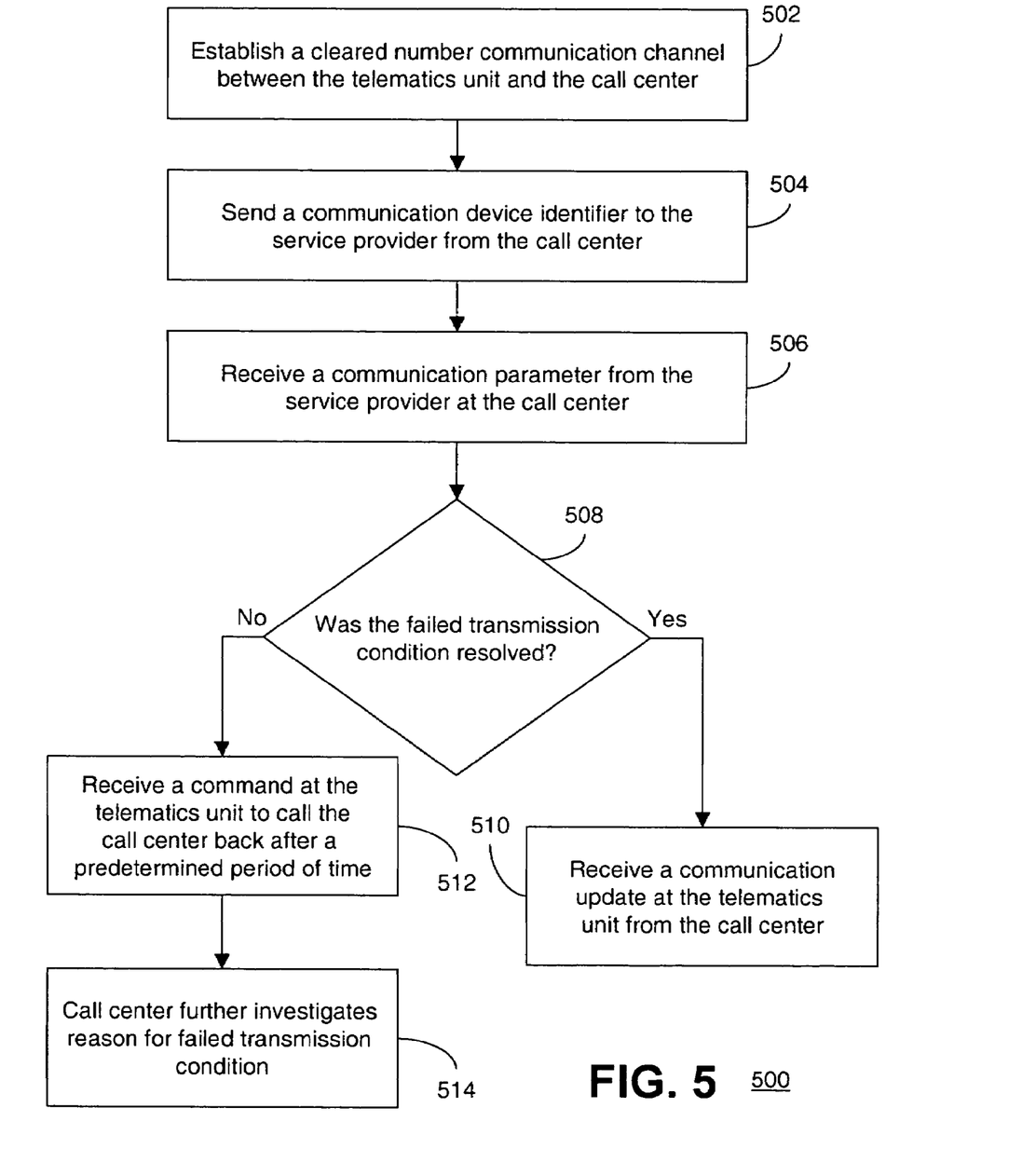
FIG. 5 is a flow diagram of another embodiment of a method of performing wireless communication diagnostics for a mobile vehicle in accordance with the present invention.

FIG. 5 is a flow diagram of another embodiment of a method 500 of performing wireless communication diagnostics for a mobile vehicle in accordance with the present invention. The telematics unit 120 experiences a failed transmission condition. The telematics unit 120 establishes a cleared number communication channel with the call center 170 (Block 502). The call center 170 sends a communication device identifier, in this case a telematics unit identifier, to the service provider 190 (Block 504). The call center 170 receives a communication parameter defining the status of the telematics unit 120 with respect to the service provider 190 (Block 506). In one embodiment, the communication parameter defining the status of the telematic unit 120 is received from the service provider 190. The call center 170 attempts to resolve the failed transmission condition. The call center 170 determines if the failed transmission condition has been resolved (Block 508). If the failed transmission condition is resolved, the call center 170 sends the appropriate communication parameter to the telematics unit 120 to solve the failed transmission condition (Block 510). If the failed transmission condition remains unresolved, the call center 170 sends a command to the telematics unit 120 to call the call center 170 back using the cleared number after a predetermined period of time has elapsed so that the call center 170 has some time to further investigate the unresolved failed transmission condition (Block 512). The call center 170 continues its investigation into the failed transmission condition (Block 514).

The telematics unit 120 establishes a cleared number communication channel between the telematics unit 120 and the call center 170 via cleared number communication sub-channels 143, 145, 155, 165 (Block 502). In one embodiment, the cleared number is a non-validating cleared number. In another embodiment, the cleared number is a cleared voice call number.

In one embodiment, when the telematics unit 120 experiences a failed transmission condition, the telematics unit 120 contacts the service provider 190 to see if the service provider 190 can resolve the failed transmission condition. If the failed transmission condition remains unresolved, the telematics unit 120 contacts the call center 170 using a cleared number.

In another embodiment, the telematics unit 120 does not establish contact with the service provider 190 to resolve the failed transmission condition. When the telematics unit 120 detects a failed transmission condition, the telematics unit 120 establishes a cleared communication channel with the call center 170 and the call center 170 works with the service provider 190 to resolve the failed transmission condition.

In one embodiment, the call center 170 checks to see if the MVCU user has an active account for telematics services. If the call center 170 determines that the MVCU user does not have an active telematics services account, the call center 170 sends a mobile deactivation signal to the telematics unit 120 in the MVCU 110. The mobile deactivation signal disables the telematics unit 120. If the call center 170 determines that the MVCU user has an active telematics services account and that the telematics unit 120 was inadvertently deactivated, the call center 170 transmits a mobile activation signal to the telematics unit 120. The mobile activation signal activates the MVCU user selected functions of the telematics unit 120. For example, a telematics unit 120 is inadvertently deactivated if the MIN is inadvertently deactivated. In one embodiment, the call center 170 contacts the service provider 190 when the MIN is inadvertently deactivated and arranges an activated MIN for the telematics unit 120. If necessary, the call center 170 programs the newly activated MIN into telematics unit 120.

Once the cleared number communication channel is established between the telematics unit 120 and the call center 170, and the call center 170 determines that telematics unit 120 has experienced a failed transmission condition, the call center 170 retrieves a communication device identifier associated with the telematics unit 120 from the communication services database 176 and sends the communication device identifier associated with the telematics unit 120 to the service provider 190 (Block 504). In one embodiment, the communication device identifier is the telematics unit ESN.

The service provider 190 makes a determination regarding the status of the telematics unit 120 and sends an appropriate communication parameter to the call center 170 (Block 506). In one embodiment the service provider 190 determines whether the MVCU user has an active account with the service provider 190 based on the received telematics unit ESN. In one embodiment, the service provider 190 determines whether the MVCU user has an active MIN with the service provider 190 based on the received telematics unit ESN. If the call center 170 determines that the MVCU user has an active account with the call center 170 and that the account with the service provider 190 was inadvertently deactivated, the call center 170 notifies service provider 190 to activate the service provider 190 user account. The service provider 190 sends a communication parameter to the call center 170 indicating that the MVCU user has an active account with the service provider 190 and that the MVCU user account has been activated. The call center determines that the failed transmission condition is resolved (Block 508) and, if necessary, sends a mobile activation signal to the telematics unit 120 (Block 510).

If the service provider 190 determines that the MVCU user does not have an active account with the service provider 190, the service provider 190 sends a communication parameter to the call center 170 indicating that the MVCU user does not have active account with the service provider 190. The call center 170 determines whether the MVCU user does have an active account with the call center 170, and if the MVCU does not have an active account, the call center 170 determines that the failed transmission condition is resolved (Block 508) and the call center 170 sends a mobile deactivation signal to the telematics unit 120 (Block 510). In one embodiment, in response to a MVCU user not having an active call center 170 account, the call center 170 communicates an account termination message to service provider 190 authorizing or confirming account termination.

In another embodiment, the call center 170 retrieves the communication device identifier from the communication services database 176. In one embodiment the communication device identifier consists of the telematics unit ESN and the telematics unit MIN listed as actually programmed in the telematics unit 120. The call center 170 sends the retrieved telematics unit ESN and the telematics unit MIN, to the service provider 190 (Block 504).

The service provider 190 determines if the MIN listed as assigned to the telematics unit 120 in the service provider records is the MIN that is actually programmed in the telematics unit 120. The MIN received from the call center 170 is the MIN that is actually programmed in the telematics unit 120. If the MIN listed as assigned to the telematics unit 120 is different from the MIN actually programmed into the telematics unit 120, the service provider 190 sends an updated MIN to the call center 170. The updated MIN is the communication parameter sent from the service provider 190 to the call center 170 (Block 506). The updated MIN is the MIN that is listed as assigned to the telematics unit 120 in the service provider records.

The call center determines that the failed transmission condition has been resolved (Block 508) and sends a communication update to the telematics unit 120 (Block 510). The call center 170 programs the telematics unit 120 with the updated MIN received from the service provider 190.

If the call center 170 is unable to resolve the failed transmission condition using the above described efforts, the call center 170 sends a command to the telematics unit 120 to call the call center 170 back using the cleared number after a predetermined period of time has elapsed (Block 512). In one embodiment, the predetermined period of time is approximately a week. In one embodiment, the telematics unit 120 displays a message on an in-vehicle display informing the MVCU user that some of the telematics unit functions may be temporarily disabled. In another embodiment, the telematics unit 120 uses the speaker 132 to communicate an electronic verbal message to the MVCU user that some of the telematics unit functions may be temporarily disabled. The call center 170 conducts further investigations into the reason for the failed transmission condition.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of performing failed wireless communication diagnostics, the method comprising:
   recognizing a failed transmission condition;
   establishing a first cleared number communication channel between a telematics unit and a service provider responsive to the failed transmission condition;
   sending a communication device identifier to the service provider from the telematics unit;
   receiving a communication parameter from the service provider at the telematics unit,
   wherein the communication parameter comprises a non-enabling communication parameter;
   establishing a second cleared number communication channel between the telematics unit and a call center; and
   sending the non-enabling communication parameter to the call center.

2. The method of claim 1, further comprising sending the communication parameter to the service provider from the call center.

3. The method of claim 1, further comprising receiving an appropriate parameter, configured to solve the failed transmission condition, from the call center at the telematics unit.

4. The method of claim 1, further comprising receiving a call command to establish a third cleared communication channel between the telematics unit and the call center after a predetermined period of time has elapsed.

* * * * *